(12) United States Patent
Asai (10) Patent No.: US 8,341,385 B2
(45) Date of Patent: Dec. 25, 2012

(54) INFORMATION PROCESSING DEVICE, INFORMATION PROCESSING METHOD, AND COMPUTER READABLE MEDIUM THEREFOR

(75) Inventor: Norihiko Asai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 816 days.

(21) Appl. No.: 12/345,033

(22) Filed: Dec. 29, 2008

(65) Prior Publication Data

US 2009/0172374 A1    Jul. 2, 2009

(30) Foreign Application Priority Data

Dec. 28, 2007 (JP) ................... 2007-340591

(51) Int. Cl.
*G06F 9/00* (2006.01)
*G06F 9/445* (2006.01)
*G06F 15/177* (2006.01)
*G06F 1/24* (2006.01)
*G06F 11/00* (2006.01)

(52) U.S. Cl. ............. 713/1; 713/2; 713/100; 714/1; 714/3

(58) Field of Classification Search ............. 713/1, 2, 713/100; 714/1, 2, 3
See application file for complete search history.

(56) References Cited

U.S. PATENT DOCUMENTS

| 6,965,953 | B2 | 11/2005 | Kujirai | |
| 2003/0005351 | A1* | 1/2003 | Lim | 714/4 |
| 2003/0154323 | A1 | 8/2003 | Kujirai | |
| 2005/0031360 | A1* | 2/2005 | Yamazaki | 399/13 |
| 2005/0183095 | A1 | 8/2005 | Kujirai | |
| 2008/0148339 | A1* | 6/2008 | Hill et al. | 726/1 |
| 2008/0244589 | A1* | 10/2008 | Darnell et al. | 718/102 |

FOREIGN PATENT DOCUMENTS

| JP | 2000207341 | 7/2000 |
| JP | 2003308215 | 10/2003 |
| JP | 2004234480 | 8/2004 |
| JP | 2004234482 | 8/2004 |
| JP | 2004-302929 A | 10/2004 |

* cited by examiner

*Primary Examiner* — Kim Huynh (74) *Attorney, Agent, or Firm* — Banner & Witcoff, Ltd.

(57) ABSTRACT

An information processing device, configured to perform information processing with an application run on an operating system, includes an installing unit configured to install the application into the information processing device, an instruction accepting unit configured to accept an instruction to run the application, a first determining unit configured to determine whether the operating system has been rebooted after the installation of the application, in response to the instruction accepted through the instruction accepting unit, and a prohibiting unit configured to prohibit the application from being run when the first determining unit determines that the operating system has not been rebooted.

15 Claims, 7 Drawing Sheets

INFORMATION PROCESSING DEVICE, INFORMATION PROCESSING METHOD, AND COMPUTER READABLE MEDIUM THEREFOR

CROSS-REFERENCE TO RELATED APPLICATION

This application claims priority under 35 U.S.C. §119 from Japanese Patent Application No. 2007-340591 filed on Dec. 28, 2007. The entire subject matter of the application is incorporated herein by reference.

BACKGROUND

1. Technical Field

The following description relates to one or more information processing techniques.

2. Related Art

Japanese Patent Provisional Publication No. 2003-308215 discloses a known information processing device configured to perform information processing with an application run on an operating system. The information processing device includes an installing unit configured to install a device driver as a kind of application, a determining unit configured to determine whether the operating system has to be rebooted after the installation of the device driver, and a control unit configured to display a screen for inducing the user to reboot the operating system or to automatically reboot the operating system when the determining unit determines that the operating system has to be rebooted.

In the aforementioned known information processing device, when the operating system has to be rebooted, the control unit informs the user of it or automatically reboots the operating system based on the determination by the determining unit. Meanwhile, in the known information processing device, when the operating system does not have to be rebooted, based on the determination by the determining unit, the control unit does not inform the user of it or automatically reboot the operating system. Therefore, according to the known information processing device, it is possible to perform rebooting required for the operating system and save unnecessary rebooting after the device driver is completely installed.

SUMMARY

In the meantime, the user may not wish to reboot the operating system immediately after the device driver is completely installed, for example, for a reason that another operation is in execution. In such a case, the aforementioned known information processing device makes it possible for the user to determine whether to reboot the operating system immediately or later.

However, when the user determines to reboot the operating system later, the user might forget to reboot the operating system and might run the device driver without rebooting the operating system. It may cause a trouble that the device driver does not work properly, for instance, because control information stored on the operating system, which is to be updated in response to the device driver being installed, is not updated.

Aspects of the present invention are advantageous to provide one or more improved information processing devices, information processing methods, and computer readable media therefor that make it possible to prevent an installed application from being run when an operating system has not been rebooted after installation of the application.

According to aspects of the present invention, an information processing device is provided, which is configured to perform information processing with an application run on an operating system. The information processing device includes an installing unit configured to install the application into the information processing device, an instruction accepting unit configured to accept an instruction to run the application, a first determining unit configured to determine whether the operating system has been rebooted after the installation of the application, in response to the instruction accepted through the instruction accepting unit, and a prohibiting unit configured to prohibit the application from being run when the first determining unit determines that the operating system has not been rebooted.

In some aspects of the present invention, for example, when a user issues an instruction to run the application through the instruction accepting unit, the first determining unit determines whether the operating system has been rebooted after the installation of the application. Then, the prohibiting unit prohibits the application from being run when the first determining unit determines that the operating system has not been rebooted.

Accordingly, in some aspects, even though the operating system is not rebooted in response to the application being installed, it is possible to prevent the installed application from being run without rebooting the operating system. Thus, it is possible to avoid a problem that the application does not work properly.

It is noted that the application may include a printer driver, a status monitor, document creating software, drawing software, and numerical calculation software.

Further, preferably, the prohibiting unit may be configured to, when an application to be run in response to the instruction accepted through the instruction accepting unit does not need to reboot the OS, allow the application to be run. Thereby, it is possible to avoid unnecessary prohibition against running of such an application.

According to aspects of the present invention, further provided is an information processing method for performing information processing with an application run on an operating system, which includes an installing step of installing the application, an instruction accepting step of accepting an instruction to run the application, a determining step of determining whether the operating system has been rebooted after the installation of the application, in response to the instruction accepted in the instruction accepting step, and a prohibiting step of prohibiting the application from being run when it is determined in the determining step that the operating system has not been rebooted.

The information processing method adopted as above can provide the same effects as the aforementioned information processing device.

According to aspects of the present invention, further provided is a computer readable medium having computer readable instructions stored thereon to be executed by a computer configured to perform information processing with an application run on an operating system. The instructions cause the computer to perform an installing step of installing the application, an instruction accepting step of accepting an instruction to run the application, a determining step of determining whether the operating system has been rebooted after the installation of the application, in response to the instruction accepted in the instruction accepting step, and a prohibiting step of prohibiting the application from being run when it is determined in the determining step that the operating system has not been rebooted.

The computer readable media adopted as above can provide the same effects as the aforementioned information processing device and information processing method.

DETAILED DESCRIPTION

It is noted that various connections are set forth between elements in the following description. It is noted that these connections in general and, unless specified otherwise, may be direct or indirect and that this specification is not interpreted to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
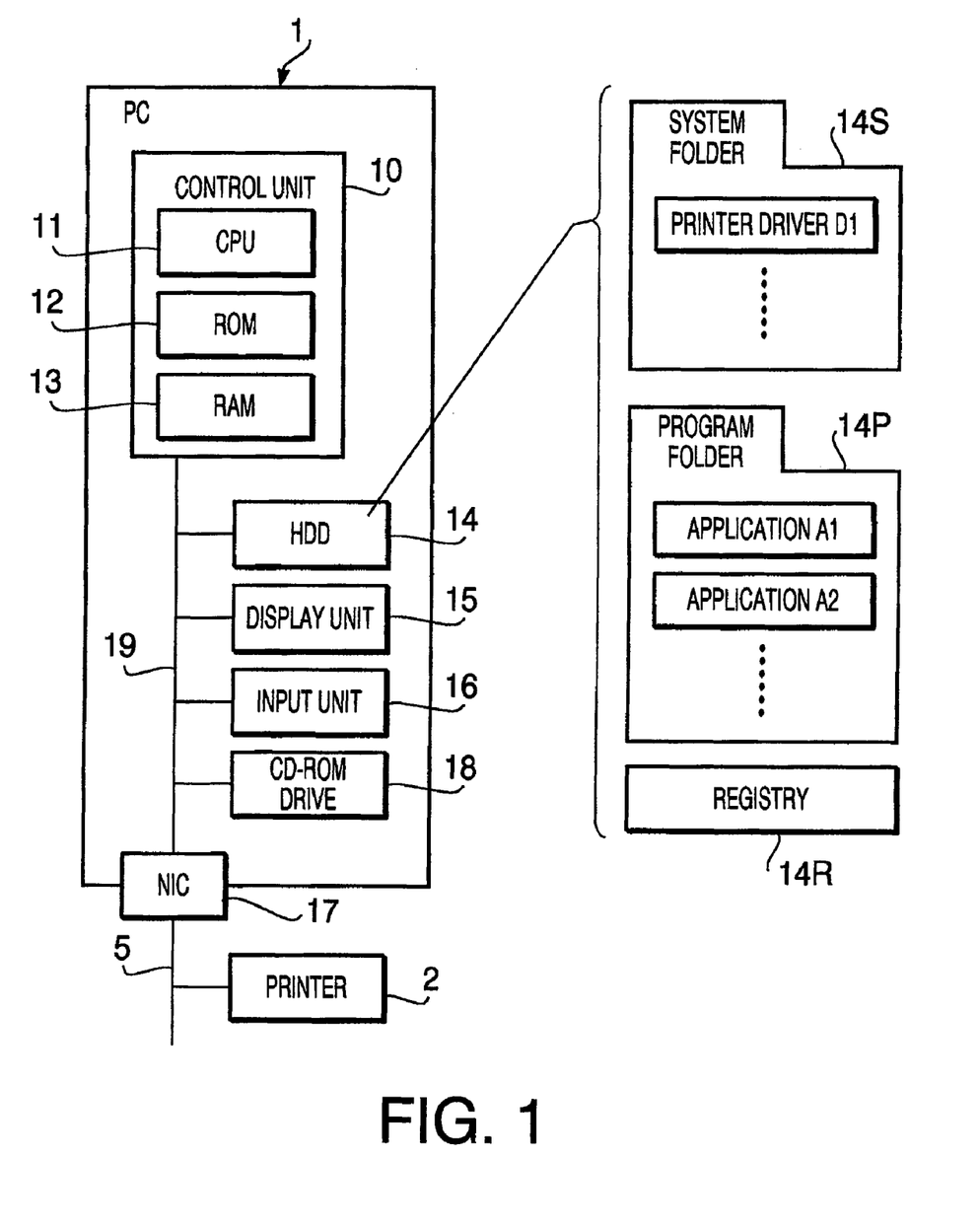
FIG. 1 is a block diagram schematically showing a configuration of an information processing device in an embodiment according to one or more aspects of the present invention.

Hereinafter, an embodiment according to aspects of the present invention will be described with reference to the accompany drawings. FIG. 1 is a block diagram schematically showing a configuration of an information processing device in an embodiment according to aspects of the present invention. As illustrated in FIG. 1, the information processing device of the present embodiment is configured as a personal computer 1 (hereinafter simply referred to as a PC 1). The PC 1 includes a control unit 10, a Hard Disk Drive (HDD) 14, a display unit 15, an input unit 16, a Network Interface Card (NIC) 17 such as a LAN adopter through which the PC 1 is connected with a network 5, and a CD-ROM drive 18 configured to read out data stored on a CD-ROM. Further, the aforementioned elements of the PC 1 are interconnected via an internal bus 19 to communicate with each other. It is noted that the information processing device according to aspects of the present invention is not limited to the PC 1 configured as above and may be an information terminal device such as a Personal Digital Assistance (PDA).

The PC 1 is an element included in a network system as well as a printer 2 as a peripheral connected with the PC 1 via the network 5 such as a Local Area Network (LAN). The printer 2 is a peripheral having a printer function of printing an image and/or a document on a recording sheet based on print data containing graphic data and/or text data transmitted by the PC 1. It is noted that the PC 1 and the printer 2 may be connected directly with each other via a cable such as a serial cable and a Universal Serial Bus (USB) cable without involving the network 5.

The display unit 15 of the PC 1 is a display device such as a Liquid Crystal Display (LCD). The display unit 15 is linked with the control unit 10 via a video board or a graphic board (not shown). The display unit is configured to display thereon a user interface screen or information such as calculation results as needed. Such displays can be achieved by a known Graphical User Interface (GUI) function provided to the PC 1.

The input unit 16 is an input device, which is connected with the control unit 10 via a USB connector or a PS/2 connector (not shown) and configured to accept various information inputted by a user therethrough.

The control unit 10, configured to get overall control over each constituent element of the PC 1, includes a known CPU 11, a known ROM 12, and a known RAM 13. Incidentally, in the PC 1, a board on which modules such as the CPU 11, the ROM 12, and the RAM 13 included in the control unit 10 are disposed is generally referred to as a motherboard.

The PC 1 has an operating system installed thereon (hereinafter, simply referred to as an "OS"). Various kinds of application software can run on the OS. The application software includes a printer driver, a status monitor, document creating software, and numerical calculation software. It is noted that a following explanation regarding the present embodiment will be given under assumption that a Windows (trademark registered) type OS is installed on the PC 1. Needless to say, aspects of the present invention can be applied to a PC with another OS installed thereon. In addition, the status monitor is configured to monitor statuses of a system environment and/or peripherals and display results of the monitoring on the display unit 15 in response to a user's request.

The HDD 14 is configured with a high capacity disk and a read/write unit being integrated. The HDD 14 is provided with a system folder 14S, a program folder 14P, and a registry 14R. The system folder 14S is adopted to store therein various system files necessary for operation of the OS, and a printer driver D1 that is a kind of device driver. The program folder 14P is adopted to store therein various kinds of application software (in the present embodiment, applications A1 and A2). The registry 14R is adopted such that device information including correspondence relationships (e.g., file referred-to destinations) between files stored in the system folder 14S and the program folder 14P and devices, and control information such as a blow-mentioned OS reboot flag F1.

The applications A1 and A2 are software adopted to run on the OS and perform specific information processing such as creating a document, drawing an image, and numerical calculation by making the aforementioned control unit 10, HDD 14, display unit 15, and input unit 16 work in cooperation with each other.

The printer driver D1 is software adopted to, for example, when printing is carried out with the printer 2, accept setting inputs from the user through a setting input screen for print settings displayed on the display unit 15 of the PC 1, configure the print settings such as settings on the size of a sheet and the number of copies for printing, and cause the printer 2 to perform printing based on the print settings. It is noted that the setting input screen is a user interface screen displayed on the display unit 15 for accepting inputs via the input unit 16.

Although details on it will be given later, installation of the applications A1 and A2, and the printer driver D1 is attained, for example, by reading out, with the CD-ROM drive 18, data from a CD-ROM with programs of the applications A1 and A2, and the printer driver D1 stored thereon, and storing the read data into the program folder 14P in HDD 14 after configuring various settings with the control unit 10. It is noted that the aforementioned programs may be obtained via a recording medium other than the CD-ROM or an electric communication network such as the Internet.

The user can instruct the applications A1 and A2, and the printer driver D1 to run by operating, through the input unit 16, a user interface screen and an icon for launching the applications A1 and A2 displayed on the display unit 15 of the PC 1 configured as above.

The user can edit data of a desired document and/or desired images with the applications A1 and A2. Additionally, the user can configure the print settings through the setting input screen for the print settings after running the printer driver D1, and print the data edited with the applications A1 and A2 or externally acquired data with the printer 2. At this time, the control unit 10 creates print data from the aforementioned data based on the print settings, and transmits the print data to the printer 2 via the NIC 17. Then, printing is executed to form an image corresponding to the print data on a recording sheet.

Subsequently, an application installing process for installing an application and an application booting process after installing the application, to be executed by the PC 1 of the present embodiment, will be described.

Generally, in the PC 1, the OS has to be rebooted prior to running an application after installing the application. This is because setting files stored along with the application stored into the program folder 14P or the system folder 14S and control information written in the registry 14R include data that is not properly updated until the OS is rebooted.

Figure 2:
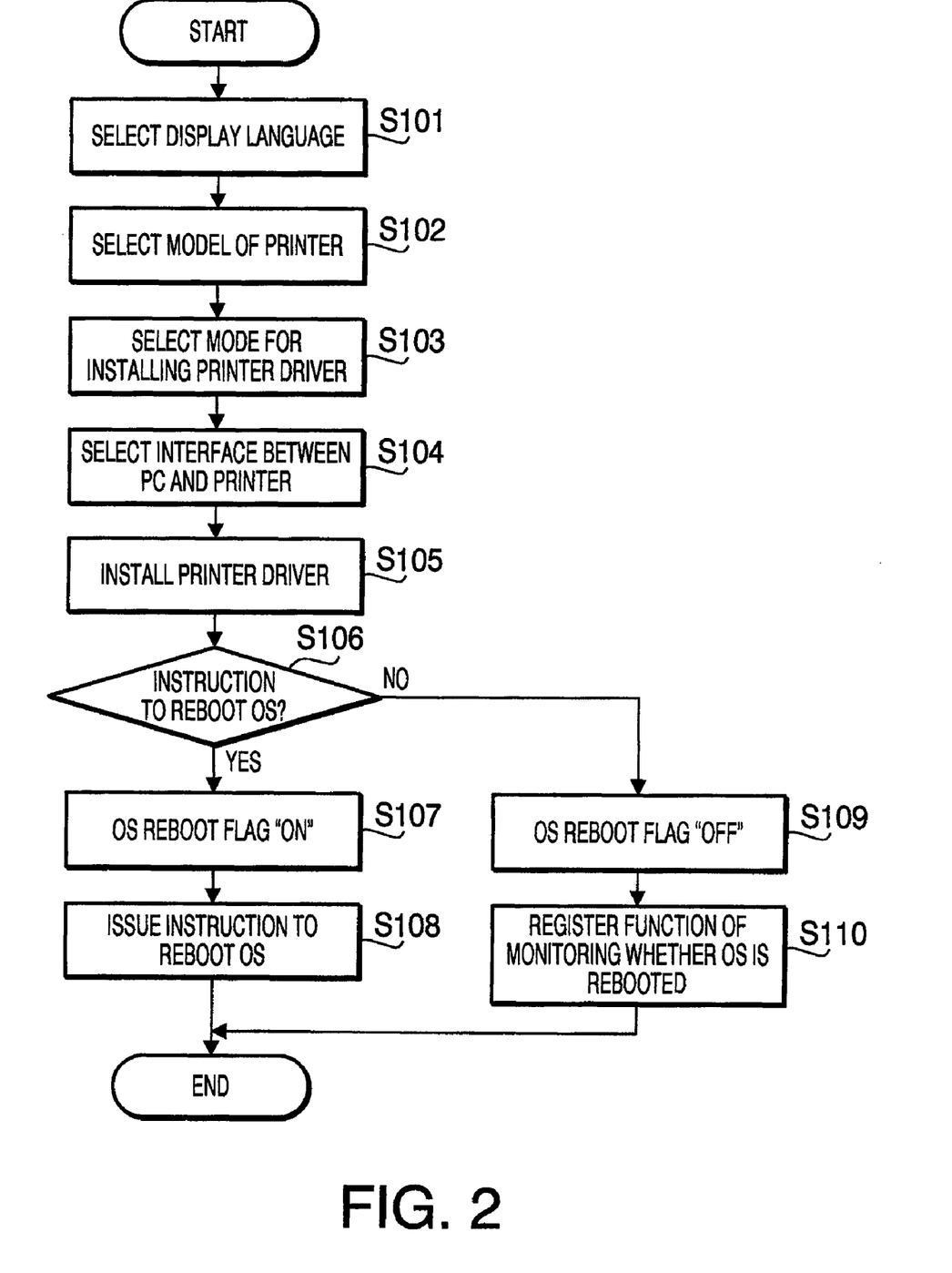
FIG. 2 is a flowchart showing a procedure of an installing process to be executed by the information processing device in the embodiment according to one or more aspects of the present invention.
Figure 3:
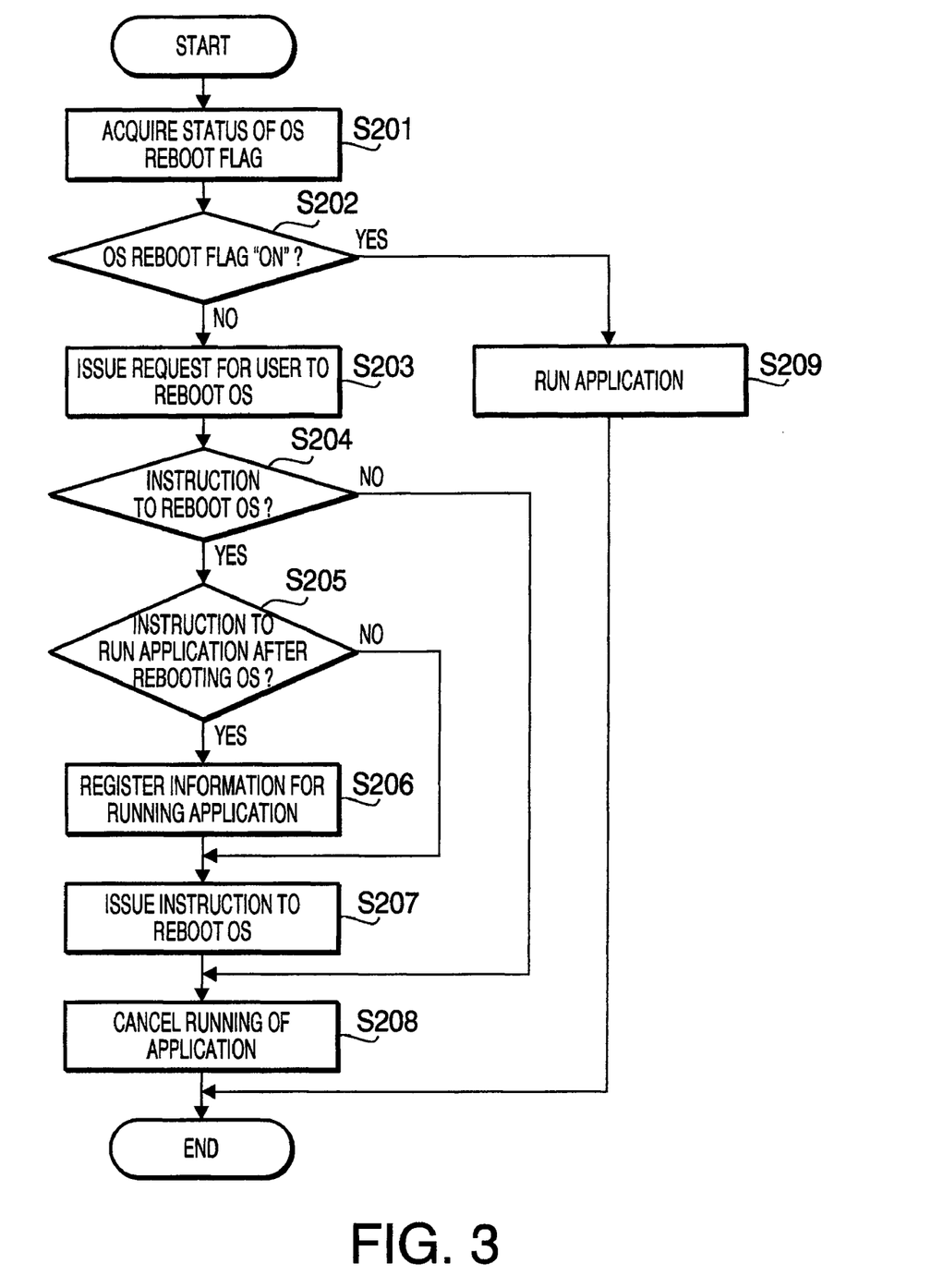
FIG. 3 is a flowchart showing a procedure of an application booting process to be executed by the information processing device in the embodiment according to one or more aspects of the present invention.
Figure 4:
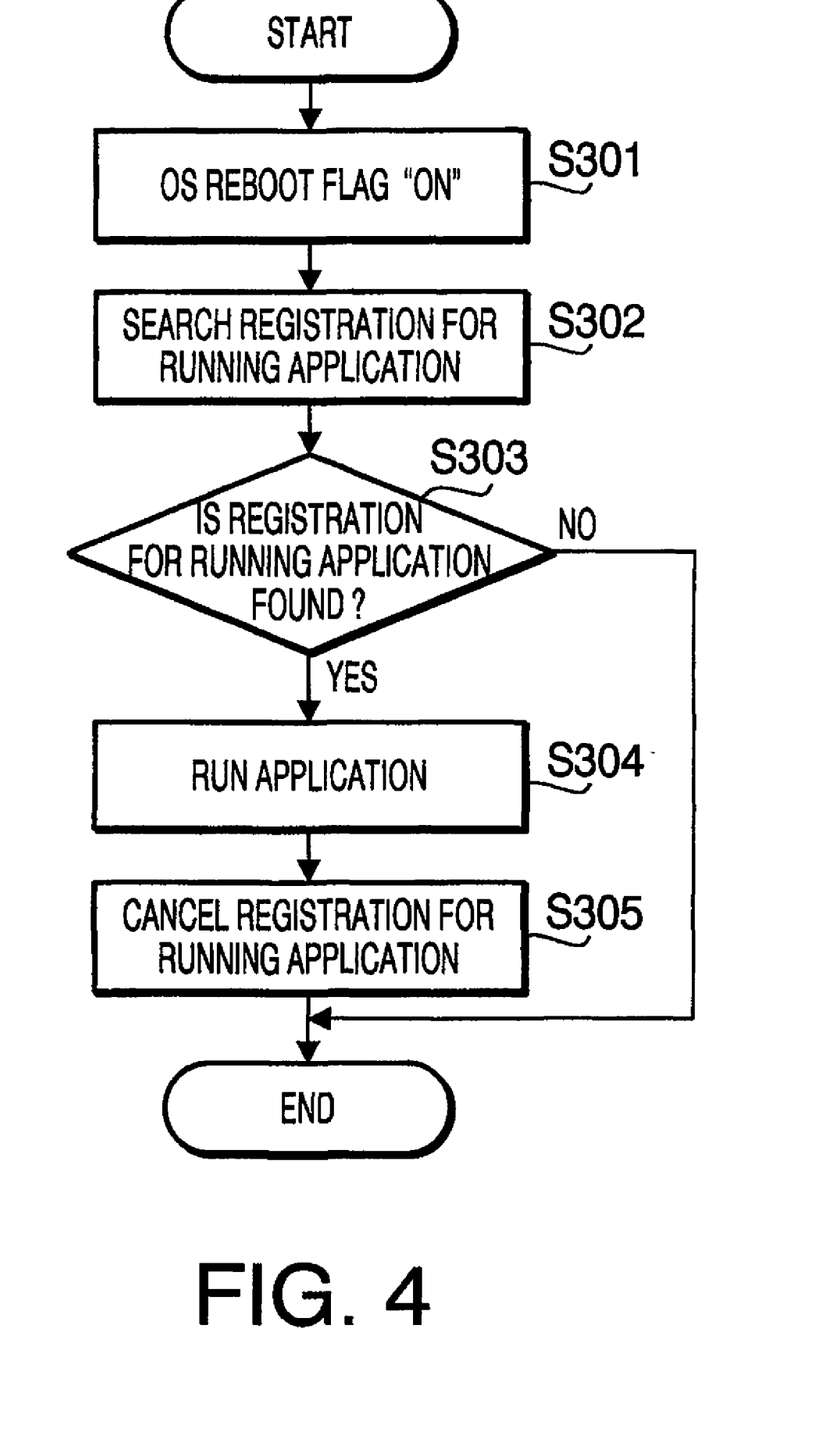
FIG. 4 is a flowchart showing a procedure of an OS reboot monitoring process to be executed by the information processing device in the embodiment according to one or more aspects of the present invention.

Therefore, the PC 1 is configured to prevent the installed application from being run before rebooting the OS, by performing the installing process, the application booting process, and the OS rebooting monitoring process in accordance with the flowcharts shown in FIGS. 2 to 4, even though the OS is not rebooted when the application is installed.

<Installing Process>

FIG. 2 is a flowchart showing a procedure of an installing process to be executed by the PC 1. The installing process will be explained step by step with reference to FIG. 2. It is noted that the following explanation will be given under assumption that the printer driver D1 for enabling the printer 2 to perform printing is installed onto the PC 1.

For example, when the user sets the CD-ROM with the printer driver D1 stored thereon into the CD-ROM drive 18, and instructs to begin installation of the printer driver D1 through the input unit 16, the control unit 10 controls the CD-ROM drive 18 to read out the data thereof and begins installation of the printer driver D1.

Firstly, in S101, a setting input screen for selecting a display language is displayed on the display unit 15. When selection of the display language is accepted through the setting input screen, the present process goes to S102. It is noted that the display language represents a language for a text displayed on the setting input screen. In addition, languages displayable in S101 include Japanese, English, and French. The following description will be given under assumption that Japanese is selected in S101 as the display language.

Next, in S102, a setting input screen for selecting a model (a model name, a type name, etc.) of the printer 2 to be connected with the PC 1 is displayed. Then, when selection of the model is accepted through the setting input screen, the present process goes to S103.

Subsequently, in S103, a setting input screen for selecting a mode for installing the printer driver D1 of the printer 2 is displayed. Then, when selection of the mode through the setting input screen is accepted, the present process goes to S104.

Next, in S104, a setting input screen for selecting an interface (e.g., a LAN, a USB cable, etc.) between the PC 1 and the printer 2 is displayed. Then, when selection of the interface is accepted through the setting input screen, the present process goes to S105.

It is noted that the steps S101 to S104 are adopted to conform to the printer driver D1, and therefore may be changed accordingly depending on an application to be installed. For instance, the selection of the interface in S104 can be omitted in installation of document creating software.

Next, in S105, the program of the printer driver D1 is stored into the system folder 14S. At this time, setting files created based on the selections in the steps S101 to S104 are stored together. Additionally, control information including device information on the printer 2 is stored into the registry 14R. At this time, as illustrated in FIG. 5, the OS reboot flag F1 and "need for rebooting application after reboot OS" flags F2 to F4 (details thereof will be described later) are set in the registry 14R.

Subsequently, in S106, a user interface screen is displayed on the display unit 15 to allow the user to determine whether to reboot the OS at the present time. For example, a message "Installation is completed. Do you want to reboot the computer?" is displayed on the user interface screen with options to be chosen by the user "Yes, I want to reboot the computer immediately." and "No, I want to reboot the computer later." When the user selects the option "Yes, I want to reboot the computer immediately," it is determined that the OS should be rebooted (S 106: Yes), and the present process advances to S107. Meanwhile, when the user selects the option "No, I want to reboot the computer later," it is determined that the OS should not be rebooted (S 106: No), the present process goes to S109.

Depending on the kind of application, an application may not need to reboot the OS. In such a case, the installing process may be terminated without involving the steps S106 to S110. Further, in such a case, it is possible to omit unnecessary reboot of the OS.

Figure 5:
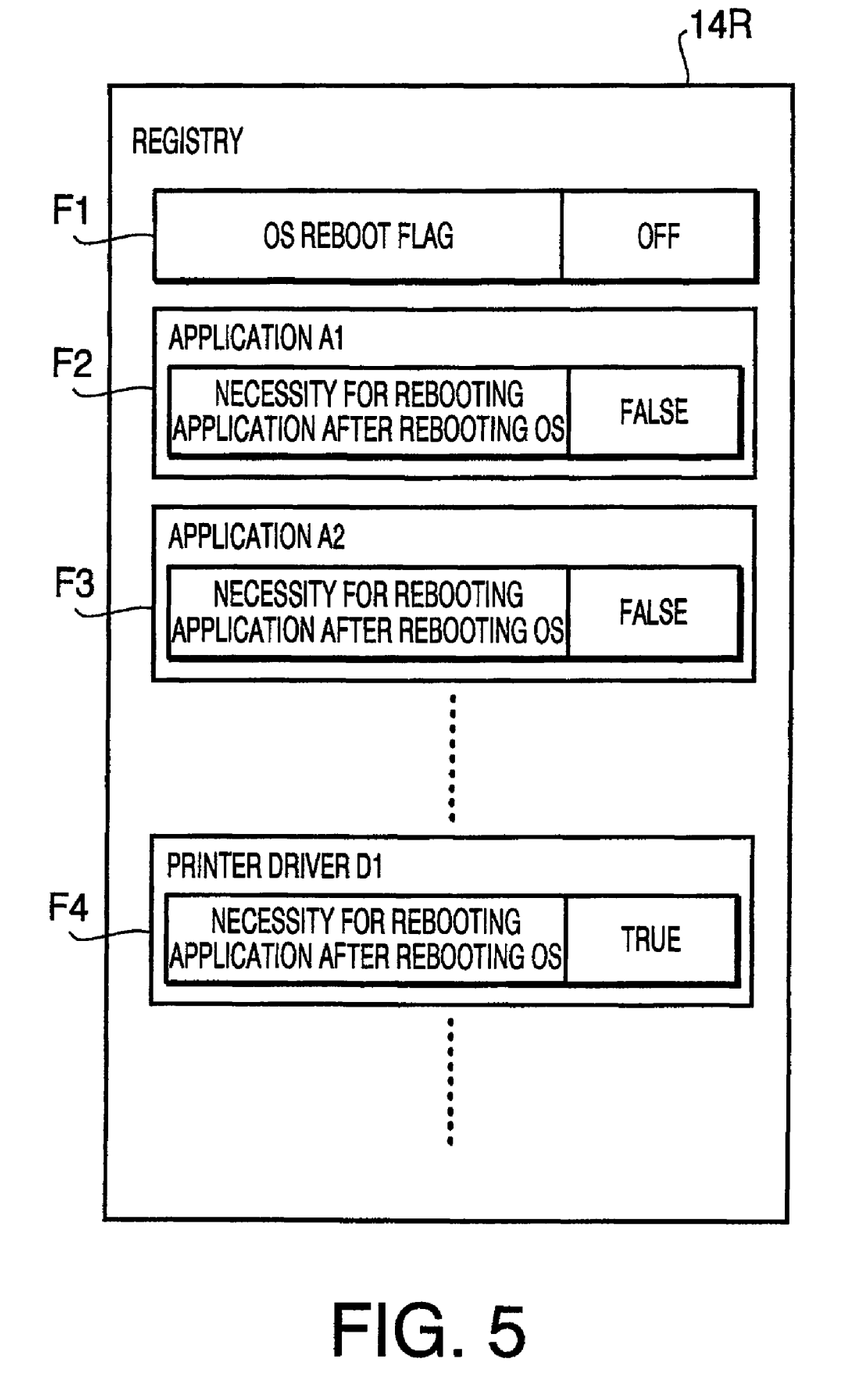
FIG. 5 is an illustration schematically showing flags registered in a registry of the information processing device in the embodiment according to one or more aspects of the present invention.

In S107, as illustrated in FIG. 5, the OS reboot flag F1 in the registry 14R is set to a status "ON." The OS reboot flag F1, which represents whether the OS has been rebooted after the installation of the application, is adopted to be switchable between "ON" and "OFF." The statuses "ON" and "OFF" are treated as "1" and "0" on computing by the PC 1, respectively.

Next, in S108, an instruction to reboot the OS is issued to the OS. The OS takes control such that the OS is automatically terminated and thereafter rebooted in response to the instruction. Then, the installing process is terminated.

Meanwhile, in S109, the OS reboot flag F1 in the registry 14R is set to "OFF." The present process goes to S110, in which a function "run once" provided to the OS is set in order to monitor whether the OS is rebooted. Specifically, the control unit 10 rewrites the setting file of the OS stored in the registry 14R so as to run an OS reboot monitoring process (details about it will be described later) as shown in FIG. 4 at once when the OS is rebooted. Then, the installing process is terminated.

<Application Booting Process>

Subsequently, an application booting process will be described step by step with reference to FIG. 3.

For example, when the user issues an instruction to run the printer driver D1 through the input unit 16 after rebooting the OS in accordance with the user's selection of rebooting the OS in S106 of the installing process when the installation of the printer driver D1 is completed, the control unit 10 begins a booting process for booting the printer driver D1.

Further, when the user issues an instruction to run the printer driver D1 through the input unit 16 after terminating the installing process without rebooting the OS in accordance with the user's selection of not rebooting the OS in S106 when the installation of the printer driver D1 is completed, the control unit 10 begins the booting process of the printer driver D1.

Firstly, in S201, the status of the OS reboot flag F1 is acquired through search in the registry 14R.

Next, when the OS reboot flag F1 is set in the status "ON" (S202: Yes), since it represents that the OS has been rebooted after the installation of the printer driver D1, the present process goes to S209, in which the printer driver D1 is run. Then, the present process is terminated.

Figure 6:
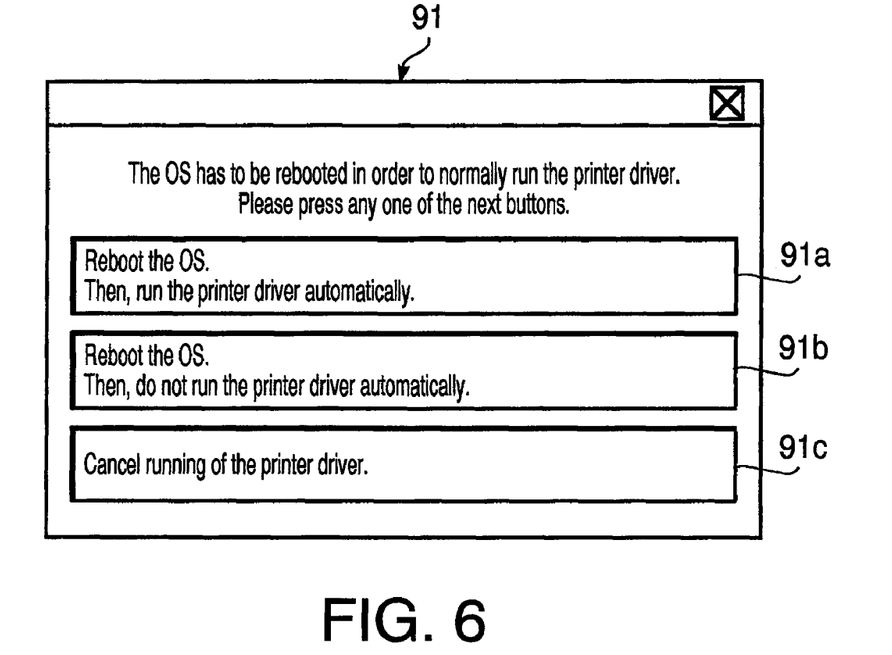
FIG. 6 is a schematic diagram illustrating a user interface screen notifying that an OS has not been rebooted in the embodiment according to one or more aspects of the present invention.

Meanwhile, when the status of the OS reboot flag F1 is "OFF" (S202: No), since it represents that the OS has not been rebooted after the installation of the printer driver D1, the present process goes to S203, in which a request for the user to reboot the OS is issued. Specifically, a user interface screen 91 as illustrated in FIG. 6 is displayed.

In an upper portion on the user interface screen 91, there is displayed a message "The OS has to be rebooted in order to normally run the printer driver. Please press any one of the next buttons."

Additionally, in a lower portion of the user interface screen 91, displayed are a button 91a "Reboot the OS. Then, run the printer driver automatically," a button 91b "Reboot the OS. Then, do not run the printer driver automatically," and a button 91c "Cancel running of the printer driver."

Subsequently, the present process goes to S204, in which it is determined whether an instruction to reboot the OS is issued by the user through one of the buttons 91a and 91b. When the user selects the button 91c (S204: No), the present process goes to S208, in which running of the printer driver D1 is canceled. Then, the present process is terminated.

Meanwhile, when the user selects one of the buttons 91a and 91b, it represents that an instruction to reboot the OS is issued by the user (S204: Yes), and therefore the present process goes to S205.

In S205, it is determined whether an instruction to automatically run the printer driver after rebooting the OS through the button 91a. When the user selects the button 91b (S205: No), the present process goes to S207, in which an instruction to reboot the OS is issued to the OS. In response to the instruction, operations of automatically terminating the OS and then rebooting the OS are carried out. Thereafter, the present process advances to S208, in which running of the printer driver D1 is canceled. Then, the present process is terminated.

Meanwhile, when the user selects the button 91a (S205: Yes), the present process goes to S206, in which information for running the application is registered. Specifically, as shown in FIG. 5, among respective flags F2 to F4 "necessity for rebooting the application after rebooting the OS" set in the registry 14R in response to the applications A1 and A2, and the printer driver D1 being installed, the flag F4 corresponding to the printer driver D1 is set to "TRUE." The flags F2 to F4 are referred to in the OS reboot monitoring process and adopted to be switchable between "TRUE" and "FALSE." The statuses "TRUE" and "FALSE" are treated as "1" and "0" on computing by the PC 1, respectively. After that, the present process advances to S207. The operations in S207 and the following step (S208) are as described above.

Thus, through the aforementioned steps S201 to S209, the printer driver D1 is run in the case where the OS has already been rebooted, while the printer driver D1 is prohibited from being run in the case where the OS has not yet been rebooted.

<OS Reboot Monitoring Process>

Subsequently, the OS reboot monitoring process will be described step by step with reference to FIG. 4.

For example, in the aforementioned application booting process, when the user determines to reboot the OS in S204 and the OS is rebooted, the control unit 10 executes the present process with the aforementioned function "run once" of the OS, in accordance with the operation in S110 of rewriting the setting file of the OS in the registry 14R so as to launch the OS reboot monitoring process.

Further, when in response to the user determining not to reboot the OS in S106 of the installing process, the installing process is terminated without rebooting the OS, and thereafter the user manually reboots the OS, the control unit 10 runs the present process with the aforementioned function "run once" of the OS, in accordance with the operation in S110 of rewriting the setting file of the OS in the registry 14R so as to launch the OS reboot monitoring process.

Firstly, in S301, the OS reboot flag F1 set to "OFF" in S109 is switched to "ON." This operation in S301 withdraws the prohibition in S208 against running the printer driver D1, when the OS is rebooted after the printer driver D1 is prohibited from being run in S208.

Subsequently, in S302, a registration for running an application is searched. Specifically, among the respective flags F2 to F4 "necessity for rebooting the application after rebooting the OS" set in the registry 14R for the applications, a flag set in a status "TRUE" is searched.

Next, in S303, it is determined whether there is an application with the flag set in "TRUE." When there is no application with the flag set in "TRUE" (S303: No), the present process is terminated. Namely, when the user manually reboots the OS or selects the button 91b "Reboot the OS. Then, do not run the printer driver automatically," the negative determination is made in S303.

Meanwhile, when there is an application with the flag set in "TRUE" (S303: Yes), the present process goes to S304. For instance, in S205, when the user selects the button 91a "Reboot the OS. Then, run the printer driver automatically," as illustrated in FIG. 5, the flag F4 "necessity for rebooting the application after rebooting the OS" corresponding to the printer driver D1 is set to "TRUE." In this case, the determination in S303 is positive (S303: Yes), and therefore the present process advances to S304.

Then, in S304, the printer driver D1 with the flag F4 set in "TRUE" is run.

Subsequently, in S305, the registration for booting the application is deleted. Specifically, the flag set in "TRUE," among the flags F2 to F4 set in the registry 14R for the respective applications, is switched to "FALSE." It is noted that the flags F2 to F4 are hardly required to be left in the registry 14R after rebooting the OS, and therefore may be deleted at this time. Then, the present process is terminated.

Thus, through the steps S301 to S305, it is possible to run the printer driver D1 after rebooting the OS depending on the user's selection.

The aforementioned processes have been described under assumption that the printer driver D1 is installed. However, the same applies to the case where the application A1 or A2 is installed. In this case, in the texts displayed on the user interface screen 91 in FIG. 6, "printer driver" is replaced with "application."

Thus, in the PC 1 of the present embodiment, when the user instructs to run the application A1, A2, or D1 through the input unit 6, it is determined in S202 whether the OS is rebooted after the application A1, A2, or D1 is installed. Then, when it is determined that the OS is not rebooted (S202: No), the application A1, A2, or D1 is prohibited from being run in S208.

Accordingly, the PC 1 of the present embodiment can prevent an installed application from being booted without rebooting the OS, even though the OS has not been rebooted at the time of installing the application. Consequently, it is possible to avoid such a problem that the application does not work normally.

Additionally, the PC 1 of the present embodiment can run the application A1, A2, or D1 without any problem owing to the operation in S301, even though the OS is manually rebooted.

Further, the PC 1 of the present embodiment can make the determination in S202 promptly and certainly based on the OS reboot flag F1.

Furthermore, the PC 1 of the present embodiment can prohibit the application from being run, easily and certainly based on the selection in S106, since the OS reboot flag F1 is registered in S107 or S109.

In addition, the OS 1 can prohibit the application from being ran or withdraw the prohibition against running the application more certainly, since the OS reboot flag F1 is registered through S110 and S301.

Additionally, the PC 1 of the present embodiment can prohibit the application from being run or withdraw the prohibition against running the application easily and certainly, since the function "run once" of the OS is used in S110, and S301 and the following steps.

Further, the PC 1 of the present embodiment provides the user with the minimum necessary notification in S203 that the OS has not been rebooted. Therefore, the PC 1 gives less botheration than a PC configured to regularly provide such notification.

Further, the PC 1 of the present embodiment can save effort of the user to manually run the application A1, A2, or D1 after the OS has been rebooted, owing to the steps S302 to S303.

Further, the PC 1 of the present embodiment is so convenient as to ask the user whether to run the application A1, A2, or D1 in S203.

Further, since the PC 1 of the present embodiment is very likely to issue a printing instruction to the printer 2 connected with the PC 1 immediately after the printer driver D1 has been installed thereinto, it can enhance the effects in the present embodiment.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

(First Modification)

Figure 7:
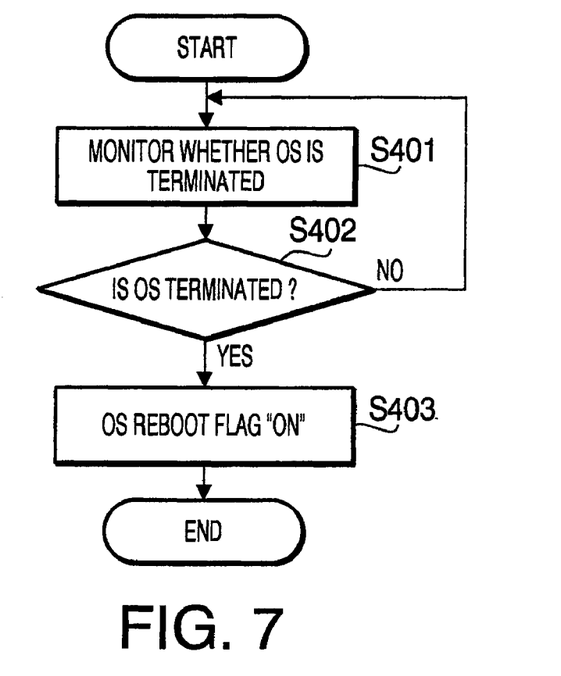
FIG. 7 is a flowchart showing a procedure of an OS reboot monitoring process to be executed by an information processing device in a first modification according to one or more aspects of the present invention.

Instead of the steps S301 to S305 in the OS reboot monitoring process as shown in FIG. 4, steps S401 to S402 in an OS reboot monitoring process as shown in FIG. 7 may be applied. Hereinafter, the OS reboot monitoring process of first modification will be described step by step.

In S106 of the aforementioned installing process, when the user determines not to reboot the OS, and the installing process is terminated without rebooting the OS, the control unit 10 executes the OS reboot monitoring process.

Firstly, the steps S401 and S402 are repeated continuously until an operation of terminating the OS is started. Then, for instance, when the operation of terminating the OS is performed in response to an instruction to turn off the PC 1 issued by the user (S402: Yes), the present process goes to S403.

Subsequently, in S403, the OS reboot flag F1 is switched to "ON," and the present process is terminated.

According to the OS reboot monitoring process of steps S401 to S403, when the steps S201 to S209 in the application booting process are executed after rebooting the OS, since the OS reboot flag F1 is set in the status "ON," the application can be run without any problem.

Meanwhile, before the OS is rebooted, namely, at the stage where the loop of steps S401 and S402 is continued, when the application booting process of the steps S200 to S209 is started, since the OS reboot flag F1 remains in the status "OFF," the application is prohibited from being run.

Thus, the PC 1 of the first modification continuously monitors in S401 and S402 whether the operation of terminating the OS is performed. Therefore, it is possible to more certainly prohibit the application from being run.

(Second Modification)

Figure 8:
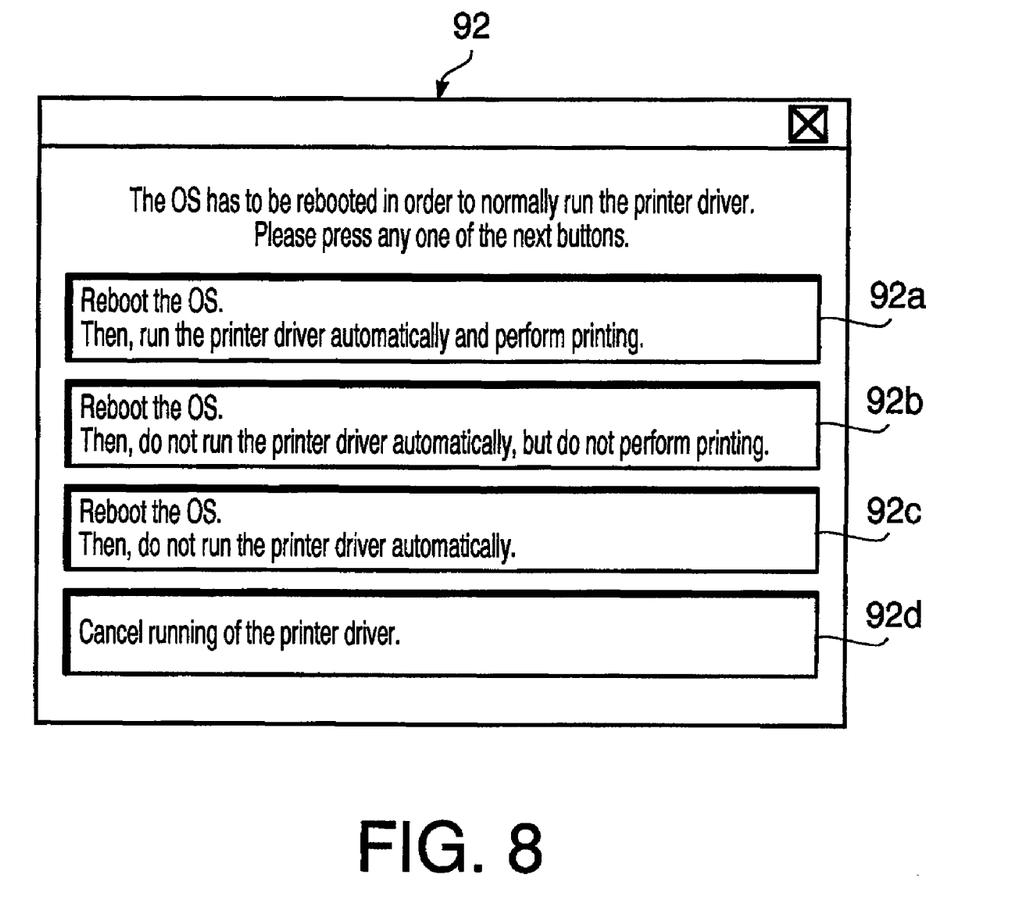
FIG. 8 is a schematic diagram illustrating a user interface screen notifying that the OS has not been rebooted in a second modification according to one or more aspects of the present invention.

In the aforementioned step S203, a user interface screen 92 as shown in FIG. 8 is displayed to allow the user to select one of four buttons 92a to 92d, as substitute for the user interface screen 91 as shown in FIG. 6.

The user interface screen 92 is displayed, for example, when the user installs a new version of printer driver D1 in the state where print settings have already been configured with an old version of printer driver D1, yet the user does not reboot the OS at that time. In such a situation, for example, when the user issues a printing instruction to print a desired document file opened on a document creating software, the control unit 10 attempts running the new version of printer driver D1. In this case, since the OS has not yet been rebooted (S202: No), the control 10 prohibits the new version of printer driver D1 from being run, and the user interface screen 92 is displayed in S203.

Here, when the user selects the button 92a "Reboot the OS. Then, run the printer driver automatically and perform printing," "execution of a printing operation after rebooting the OS" is additionally registered in S206. Thereby, the control unit 10 runs the new version of printer driver D1 in accordance with the steps S301 to S305 after rebooting the OS in S207. Then, the control unit 10 creates print data in accordance with the print settings configured prior to rebooting the OS, and transmits the print data to the printer 2 so that the printer 2 can print the print data.

Thus, in the second modification, since the control unit 10 creates the print data in accordance with the print settings configured prior to rebooting the OS, after running the printer driver D1 in S304, it is possible to save user effort to reconfigure the print settings.

Further, when the user selects the button 92b "Reboot the OS. Then, run the printer driver automatically, but do not perform printing," "execution of a printing operation after rebooting the OS" is not additionally registered in S206. Thereby, the control unit 10 runs the new version of printer driver D1 in accordance with the steps S301 to S305 after rebooting the OS in S207. However, the control unit 10 does not create print data in accordance with the print settings configured prior to rebooting the OS. Hence, the printing operation is not executed by the printer 2.

Further, when the user selects the button 92c "Reboot the OS. Then, do not run the printer driver automatically," the OS is rebooted in accordance with S207. However, the flag F4 remains in "FALSE," and the new version of printer driver D1 is not run.

What is claimed is:

1. An information processing device configured to perform information processing with an application run on an operating system, comprising:
   a processing unit;
   memory having machine readable instructions stored thereon that, when executed by the processing unit, cause the information processing device to operate as:
   an installing unit configured to install the application into the information processing device;
   an instruction accepting unit configured to accept an instruction to run the installed application;
   a first determining unit configured to, in response to acceptance of the instruction to run the installed application through the instruction accepting unit, determine whether the operating system has been rebooted after the installation of the application;
   a prohibiting unit configured to, when the first determining unit determines that the operating system has not been rebooted, prohibit the installed application from being run;
   a setting unit configured to set a status of OS reboot information representing whether the operating system has been rebooted after the installation of the application, wherein the first determining unit determines whether the operating system has been rebooted after the installation of the application, based on the OS reboot information; and
   a monitoring unit configured to monitor whether the operating system is rebooted, the monitoring unit being launched when the operating system is not rebooted in response to the installation of the application, wherein the setting unit sets the status of the OS reboot information based on an outcome obtained through the monitoring unit.

2. The information processing device according to claim 1, wherein the memory has further machine readable instructions stored thereon that, when executed by the processing unit, cause the information processing device to operate as a prohibition withdrawing unit configured to stop the prohibiting unit from prohibiting the installed application from being run when the operating system is rebooted after the application is prohibited from being run.

3. The information processing device according to claim 1, wherein the memory has further machine readable instructions stored thereon that, when executed by the processing unit, cause the information processing device to operate as a selection accepting unit configured to accept a selection of whether to reboot the operating system after the installation of the application,
   wherein the setting unit sets the status of the OS reboot information based on the selection accepted by the selection accepting unit.

4. The information processing device according to claim 1, wherein the monitoring unit is launched before the operating system is rebooted, and
   wherein, when the operating system is terminated, the setting unit sets the OS reboot information to a status representing that the operating system has been rebooted, based on the outcome obtained through the monitoring.

5. The information processing device according to claim 1, wherein the monitoring unit is launched when the operating system is rebooted, and
   wherein the setting unit sets the OS reboot information to a status representing that the operating system has been rebooted, based on the outcome obtained through the monitoring.

6. The information processing device according to claim 1, wherein the memory has further machine readable instructions stored thereon that, when executed by the processing unit, cause the information processing device to provide notification via a notifying unit that the operating system has not been rebooted when the prohibiting unit prohibits the application from being run.

7. The information processing device according to claim 1, wherein the memory has further machine readable instructions stored thereon that, when executed by the processing unit, cause the information processing device to operate as:
   a second determining unit configured to determine whether the operating system has been rebooted after the prohibiting unit prohibits the installed application from being run; and
   an application running unit configured to run the application when the second determining unit determines that the operating system has been rebooted.

8. The information processing device according to claim 7, wherein the memory has further machine readable instructions stored thereon that, when executed by the processing unit, cause the information processing device to operate as a selection accepting unit configured to accept a selection of whether to allow the application running unit to run the application.

9. The information processing device according to claim 7, wherein the application includes a printer driver, and
   wherein the memory has further machine readable instructions stored thereon that, when executed by the processing unit, cause the information processing device to operate as a creating unit configured to create print data based on print settings configured prior to rebooting the operating system, after the application running unit runs the printer driver.

10. The information processing device according to claim 1, wherein the application includes a device driver.

11. An information processing method for performing information processing with an application run on an operating system, comprising:
    installing the application into an information processing device;
    accepting an instruction to run the installed application;

determining whether the operating system has been rebooted after the installation of the application, in response to the instruction being accepted;
prohibiting, when the determining determines that the operating system has not been rebooted, the installed application from being run;
setting a status of OS reboot information on the information processing device representing whether the operating system has been rebooted after the installation of the application; and
monitoring whether the operating system is rebooted, the monitoring being launched when the operating system is not rebooted in response to the installation of the application,
wherein the setting sets the status of the OS reboot information based on an outcome obtained through the monitoring, and
wherein the determining determines whether the operating system has been rebooted after the installation of the application, based on the OS reboot information.

12. A non-transitory computer readable medium having computer readable instructions stored thereon that, when executed by a computer configured to perform information processing with an application run on an operating system, perform:
installing the application;
accepting an instruction to run the installed application;
determining whether the operating system has been rebooted after the installation of the application, in response to the instruction being accepted;
prohibiting, when the determining determines that the operating system has not been rebooted, the installed application from being run;
setting a status of OS reboot information representing whether the operating system has been rebooted after the installation of the application; and
monitoring whether the operating system is rebooted, the monitoring being launched when the operating system is not rebooted in response to the installation of the application,
wherein the setting sets the status of the OS reboot information based on an outcome obtained through the monitoring, and
wherein the determining determines whether the operating system has been rebooted after the installation of the application, based on the OS reboot information.

13. An information processing device configured to perform information processing with an application run on an operating system, comprising:
a processing unit;
memory having machine readable instructions stored thereon that, when executed by the processing unit, cause the information processing device to operate as:
an installing unit configured to install the application including a new version of a printer driver into the information processing device;
an instruction accepting unit configured to accept an instruction to run the installed application;
a first determining unit configured to determine whether the operating system has been rebooted after the installation of the application, in response to the instruction accepted through the instruction accepting unit; and
a prohibiting unit configured to, when the first determining unit determines that the operating system has not been rebooted, prohibit the installed application from being run;
a second determining unit configured to determine whether the operating system has been rebooted after the prohibiting unit prohibits the installed application from being run;
an application running unit configured to run the application when the second determining unit determines that the operating system has been rebooted; and
a creating unit configured to create print data based on print settings configured with an old version of the printer driver prior to rebooting the operating system, after the application running unit runs the new version of the printer driver.

14. An information processing method for performing information processing with an application run on an operating system, comprising:
installing the application including a new version of a printer driver into an information processing device;
accepting an instruction to run the installed application;
determining whether the operating system has been rebooted after the installation of the application, in response to the instruction accepted in the instruction accepting step;
prohibiting, when the determining determines that the operating system has not been rebooted, the installed application from being run;
determining whether the operating system has been rebooted after prohibiting the installed application from being run;
running the application on the information processing device when determining that the operating system has been rebooted; and
creating print data based on print settings configured with an old version of the printer driver prior to rebooting the operating system, after running the new version of the printer driver.

15. A non-transitory computer readable medium having computer readable instructions stored thereon that, when executed by a computer configured to perform information processing with an application run on an operating system, perform:
installing the application including a new version of a printer driver;
accepting an instruction to run the installed application;
determining whether the operating system has been rebooted after the installation of the application, in response to the instruction accepted in the instruction accepting step;
prohibiting, when the determining determines that the operating system has not been rebooted, the installed application from being run;
determining whether the operating system has been rebooted after prohibiting the installed application from being run;
running the application when determining that the operating system has been rebooted; and
creating print data based on print settings configured with an old version of the printer driver prior to rebooting the operating system, after running the new version of the printer driver.

* * * * *